May 1, 1923. Re. 15,588

S. H. BISHOP ET AL

SUPPORT FOR MOTH REPELLENT HOLDERS

Original Filed Aug. 18, 1919

Inventors
John Queen Slye and
S. Howard Bishop,
By R. A. Boswell & Co.,
Their Attorneys Reissued May 1, 1923. Re. 15,588

UNITED STATES PATENT OFFICE.

SAMUEL HOWARD BISHOP AND JOHN QUEEN SLYE, OF WASHINGTON, DISTRICT OF COLUMBIA.

SUPPORT FOR MOTH-REPELLENT HOLDERS.

Original No. 1,344,318, dated June 22, 1920, Serial No. 318,356, filed August 18, 1919. Application for reissue filed June 22, 1922. Serial No. 570,262.

*To all whom it may concern:*

Be it known that SAMUEL H. BISHOP and JOHN QUEEN SLYE, citizens of the United States of America, residing at Washington, District of Columbia, have invented a new and useful Support for Moth-Repellent Holders, of which the following is a specification.

The primary object of the invention is to provide a support and holder of this character, which is extremely simple, efficient and practical in construction, and particularly adapted for use in connection with pianos or similar musical instruments for preventing propagating of moths and like insects in pianos.

Heretofore moth repellents or moth balls have been placed in bags or similar containers and hung in the piano case, for preventing moths from eating the felt on the hammers and other parts thereof.

This invention contemplates a holder or container having its walls perforated and adapted for the reception of the moth repellents or moth balls, and furthermore to provide a support which may fit any one of the tuning pins, and provided with spaced spring arms, having means carried by the arms to engage axially alined perforations of the opposite ends of the container or holder, for conveniently supporting the same in position.

A further object of the invention is the provision of a support, which not only supports the holder or container in place, but also holds the lid or cover of the holder securely in position, and in such wise that the holder may be easily moved and the cover opened for replenishing the moth balls. Furthermore, it is obvious that the holder may be turned, so as to agitate the moth balls or repellents, as they become evaporated, so that the fumes will more readily circulate through the piano case.

A still further object of the invention is the provision of a support which may not only act as such, but may also be used as a tuning key, for adjusting the tuning pins, for the purpose of tuning the various springs of the piano. Moreover, it is the aim to provide a support, which may not only be employed with upright pianos, but may be also used in connection with flat top pianos, such as the baby grand style or the like.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

Figure 1:
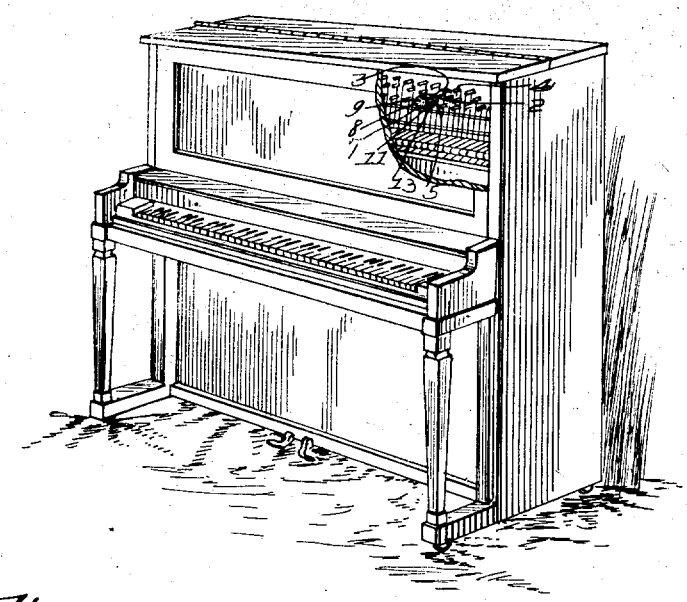
Figure 1 is a perspective view of a conventional form of piano, showing a portion of the front of the case broken away, illustrating the support and holder or container, as applied to the tuning pins of the instrument.
Figure 2:
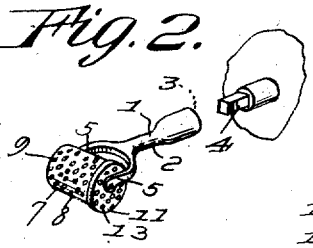
Fig. 2 is an enlarged detail perspective view of the support, showing the holder in position between the spaced arms.
Figure 3:
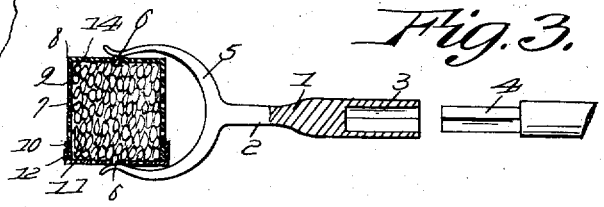
Fig. 3 is a view showing the holder or container in section, and a portion of the support in section, showing the container or holder in position between the arms of the support, the support being in a position to engage a tuning pin.
Figure 5:
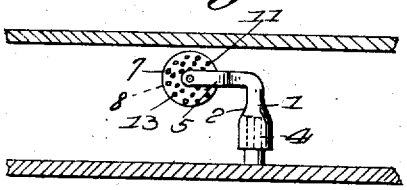
Fig. 5 is a view in section, showing a modified form of support as applied to a tuning pin of a flat top piano, such as a baby grand or the like, showing the support of angular form, so as to hold the container in position under the cover of the piano.
Figure 4:
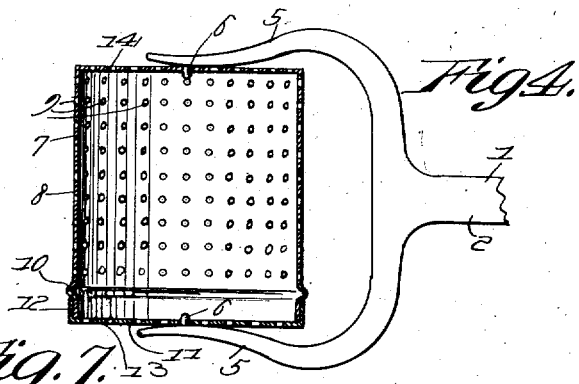
Fig. 4 is an enlarged detail view of the container or holder more clearly showing the details of construction, and one of the spring arms of the support in engagement with the holder.
Figure 6:
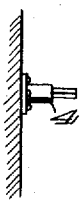
Fig. 6 is a detail view of a stationary support to be mounted on some other suitable part of the interior of the piano case.
Figure 7:
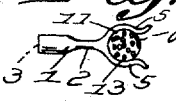
Fig. 7 is a detail view of a modified form of support for a container.

Referring more especially to the drawings, 1 designates the support as a whole, which comprises a shank 2, which has an enlarged portion provided with a socket 3. This socket 3 is preferably of rectangular form in cross-section, so as to engage a tuning pin 4 of the piano, which tuning pin is likewise rectangular in cross-section, so as to hold the support as projecting laterally from the spring carrying frame of the piano. The support opposite the enlargement is provided with a pair of spaced arms 5, which are shaped substantially as shown, though not necessarily, for it is obvious they may be otherwise shaped. These spring arms 5 have oppositely arranged axially alined pins or lugs 6. The spring arms 5 are designed purposely for the support of a repellent or moth ball container or holder 7. This container or holder may be any suitable shape, preferably such as that illustrated, though not necessarily, and it comprises a cylindrical holder body 8, which may be constructed of any suitable light sheet metal, such as aluminum or the like. This body of the container or holder is perforated throughout its cylindrical wall, as indicated at 9. Near the open end of the container or holder, the wall thereof is provided with an annular bead 10. This bead may be formed by depressing the wall of the container in the usual manner, and this bead constitutes a shoulder. The body of the container or holder is provided with a cover 11, which has a marginal flange 12, whereby the cover may telescopically fit the container or holder. The flange of the cover is designed to engage the shoulder, thereby limiting the cover in its position. The cover 11 and the opposite closed end of the container are provided with perforations 13 and 14, which together with the perforations of the cylindrical wall of the container, allow the escape of the fumes from the moth repellents or moth balls, so that the fumes may thoroughly circulate through the interior of the piano case. Certain of the perforations of the apertures in the closed end of the body of the container and the cover are axially alined, centrally with the container, and are designed to receive the axially alined pins or lugs 6, which are carried by the spring arms of the support. In this manner, the holder or container may be easily supported in position. Every now and then, say for instance about every couple of months, the front of the piano case may be removed, so that a partial movement may be imparted to the holder or container, in order to agitate the moth balls or repellents, or in order to change the positions of the moth balls or repellents, so as to permit the fumes to rise therefrom more thoroughly. In addition to the support acting as means for supporting the container or holder, the support may be very readily employed as a turning key, for adjusting the tuning pins of the piano. This may be accomplished by removing the container or holder, and allowing the hand of the operator to grasp the support, between the spring arms, so that the turning key may be partially rotated, as may be desired to adjust the tuning pins, so as to tune the strings of the piano. This improved support and holder or container are illustrative as applied to an upright piano, but it is obvious that it may be employed equally as well in connection with flat top pianos, such as the baby grand style. In this latter case, however, in some instances, the space between the frame which carries the tuning pins and the wall of the outer case is more or less narrow, and in such an instance, a support, such as illustrated in Figs. 2 and 3 could not be used in a manner convenient to support the holder or container, so as to not engage the outer wall of the piano case. To obviate this, as illustrated in Fig. 5, the support is formed angular, in other words, the portion of the support carrying the spring arms is formed at right angles to the part having the socket 3, whereby the container or holder may be conveniently positioned, so as not to be in engagement with the wall of the piano case. Furthermore, the support may be used or positioned in any other location on the inner portion of the piano case, if desired. This may be accomplished, by attaching a stationary projection, similar in shape to the tuning pin 4, to the inner wall of the piano case, such as indicated in Fig. 6. Moreover, the spring arms of the support may be constructed, so as to fit around the cylindrical wall of the container or holder, instead of engaging the ends of the container, as illustrated in Fig. 7.

The invention having been set forth, what is claimed as new and useful is:

1. A moth repellent container, and a support therefor selectively engageable telescopically over the tuning pins of a piano.

2. A moth repellent container, and a support therefor provided with a socketed end for selective engagement telescopically over the tuning pins of a piano.

3. A device for the purpose indicated comprising a container for a moth repellent, and a support for the same selectively engageable telescopically over the tuning pins of a piano, said support having terminal spring arms detachably engaging said container.

4. A device for the purpose indicated comprising a container for a moth repellent, and a support for the same selectively engageable telescopically over the tuning pins of a piano, said support revolubly supporting said container.

5. The combination with a support provided with a socket, adapted to engage a stationary projection of the inner portion of a piano case, said support having at one end a pair of spaced spring arms, of a container for moth repellents provided with perforations in its wall and its opposite ends, and means carried by the spring arms engaging in certain of the perforations of the opposite ends of the container or holder.

6. In a support for moth repellent containers for pianos, the combination with a container comprising a perforated hollow body having a detachably telescopically fitted cover, a support therefor having a socket at one end to engage a stationary support, the opposite end of said support having opposite spaced spring arms provided with axially alined lugs to engage in certain of the perforations of the cover and the body of the container, thereby not only supporting the container in place, but also retaining the cover thereof in position.

7. In a device as set forth, a support comprising a shank having a socket at one end to engage a stationary support, its opposite end having oppositely arranged spaced arms, the adjacent faces of the arms having axially alined lugs, of a perforated container having a detachable perforated cover through certain of the perforations of which and the cover, said axially alined lugs may engage, whereby the cover may be held on the body of the container, and the container supported.

8. The combination with a detachable socketed support member having spaced yieldable arms at one end, of a perforated repellent container having a perforated closure fitting the same, and means carried by the adjacent faces of the arms to engage certain axially alined perforations of the cover and the container acting to support the container and hold the cover connected to the container.

9. The combination with a repellent container, of a support having a socket at one end adapted to engage any one of the tuning pins of a piano, means at the other end of the support for clamping the repellent container and holding the same revolubly in place.

10. The combination with a socketed support, of a perforated repellent container having a telescopical closure, and means at one end of the support for clamping the container centrally revolubly and holding the closure in a closed position on the body of the container to permit rotation of the same.

11. The combination with a removable support having a socket at one end to receive a stationary projection and provided at its other end with spaced yieldable members, the adjacent faces of which being provided with axially alined lugs, of a perforated repellent container having a perforated closure telescopically fitting the same, certain axially alined perforations of the body of the container and the closure adapted to receive the axially alined lugs to retain the container in position and hold the closure closed.

12. A camphor holder for pianos, comprising a perforated container, and a metal tube projecting from its back, the other unattached free end of said tube being hollow, whereby it is adapted to frictionally engage over a tuning-pin, the container being of such shape as to be held thereby continuously out of contact with other parts of the piano.

13. A camphor holder for pianos, comprising a perforated container and a support attached at one end to said container, whereby said support may project from the back of the container, the other unattached free end of said support being hollow, whereby it may frictionally engage over a tuning-pin of said piano, said container being of such shape as to be held thereby continuously out of contact with other parts of the piano.

In witness whereof, they hereunto affix their signatures.

SAMUEL HOWARD BISHOP.
JOHN QUEEN SLYE.